Jan. 9, 1968   H. PRELLER ET AL   3,362,056
METHOD OF FABRICATING STRUCTURAL SHAPES
Filed June 5, 1964   7 Sheets-Sheet 1

INVENTORS
HANS PRELLER
KARL-GERD KRÄMER

By: McGlew and Toren
ATTORNEYS

Jan. 9, 1968   H. PRELLER ET AL   3,362,056
METHOD OF FABRICATING STRUCTURAL SHAPES
Filed June 5, 1964   7 Sheets-Sheet 2

INVENTORS
HANS PRELLER
KARL-GERD KRÄMER
By: McGlew and Toren
ATTORNEYS

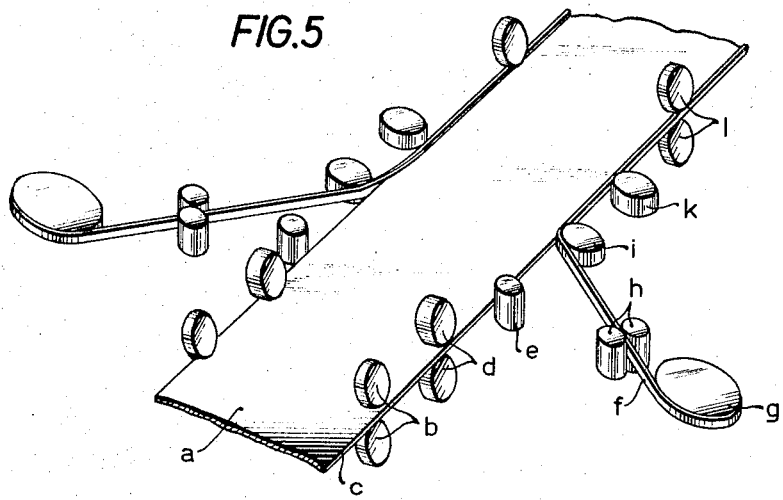
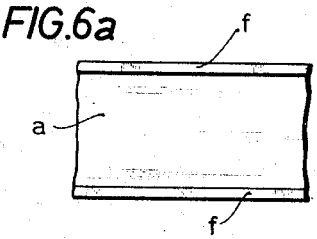
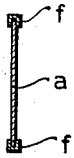
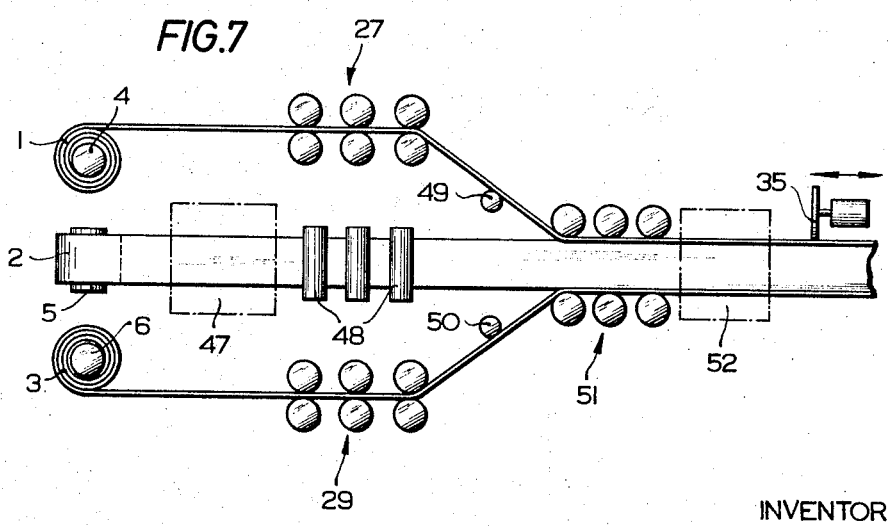

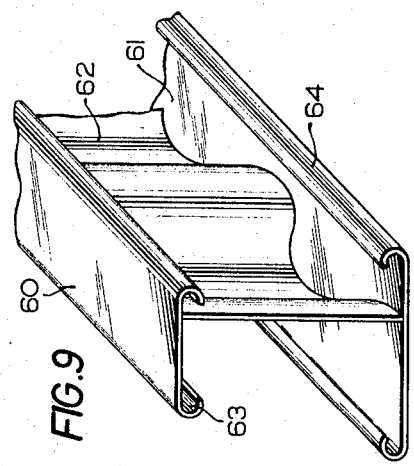
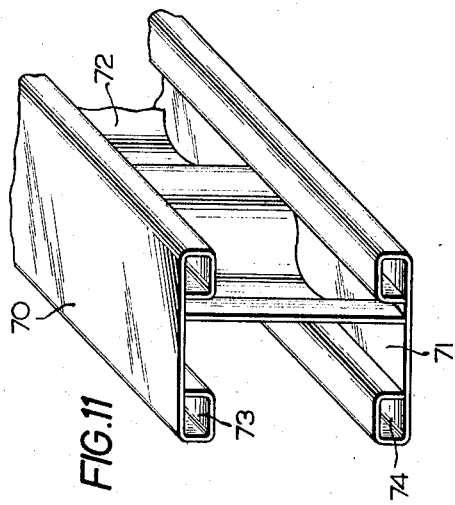
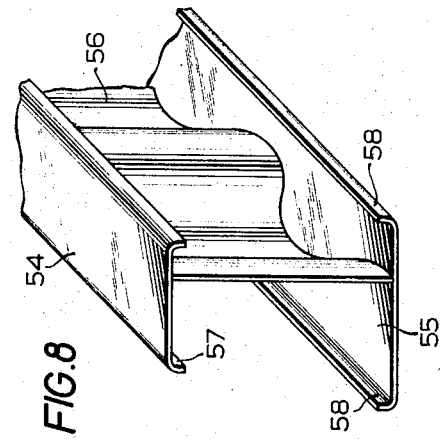
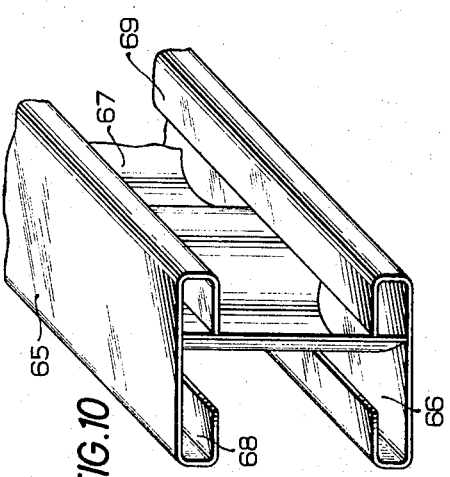

Jan. 9, 1968  H. PRELLER ET AL  3,362,056
METHOD OF FABRICATING STRUCTURAL SHAPES
Filed June 5, 1964  7 Sheets-Sheet 5
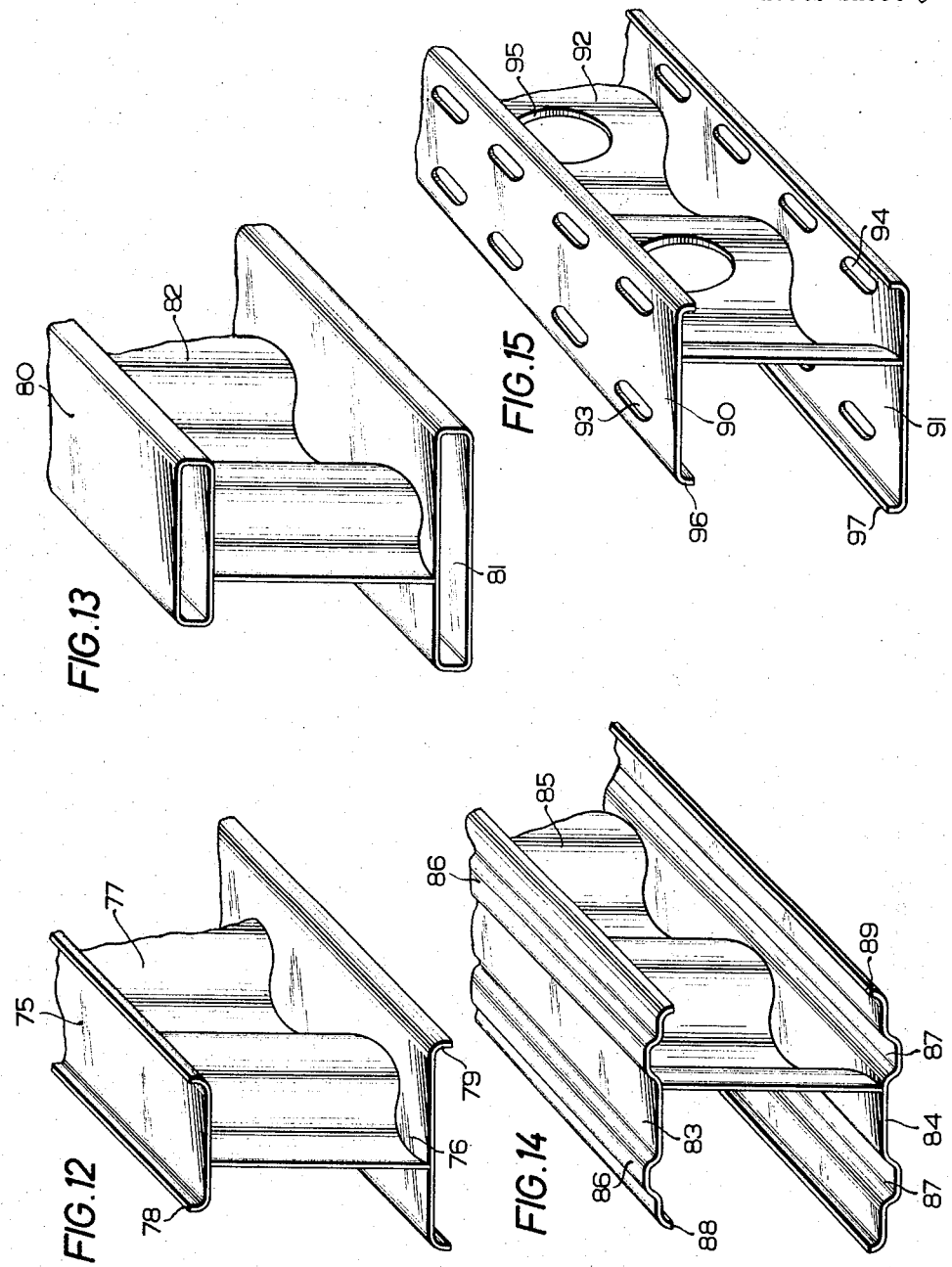
INVENTORS
Hans PRELLER
Karl-Gerd KRÄMER
By: McGlew and Toren
ATTORNEYS

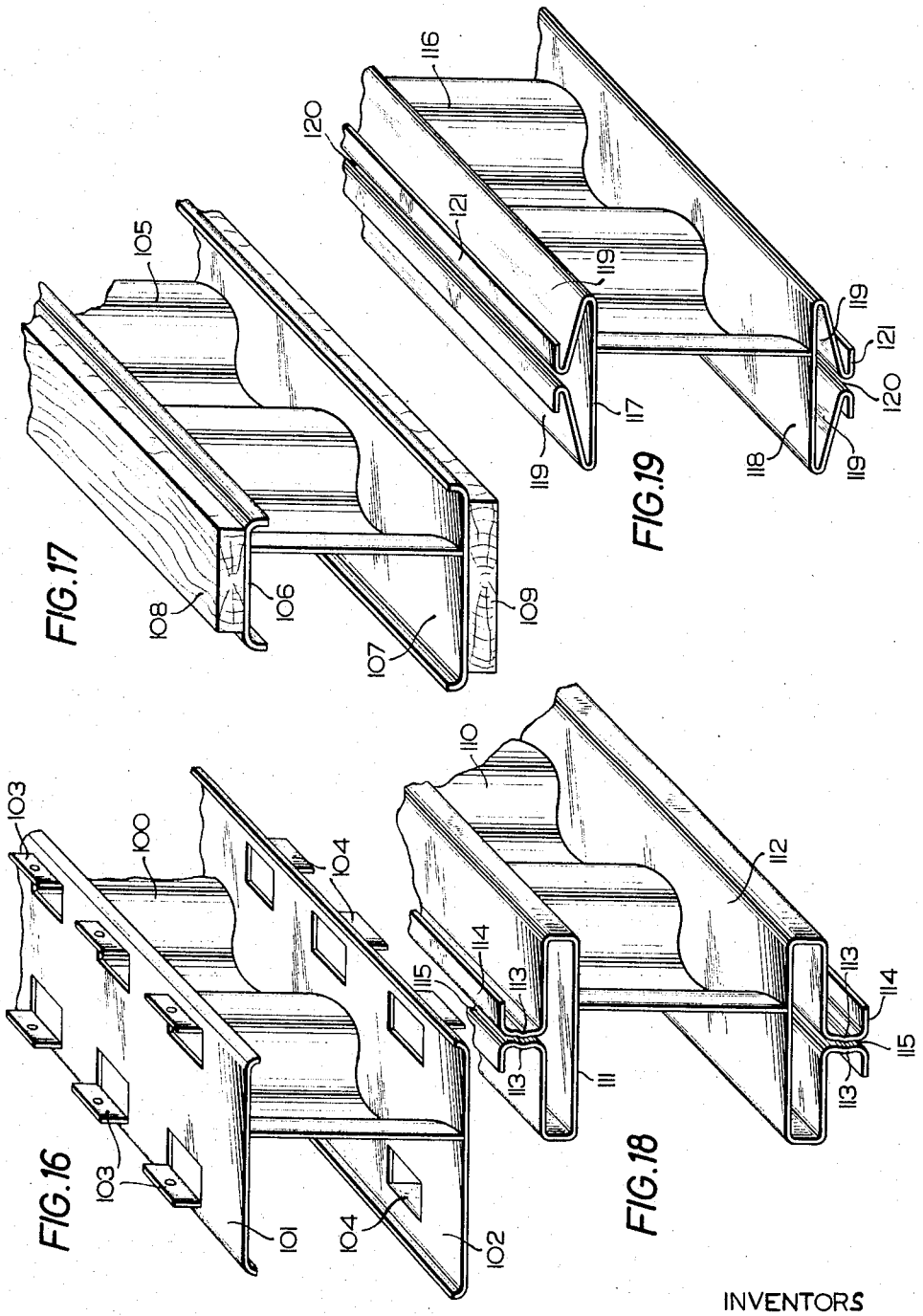

Jan. 9, 1968    H. PRELLER ET AL    3,362,056
METHOD OF FABRICATING STRUCTURAL SHAPES
Filed June 5, 1964    7 Sheets-Sheet 7
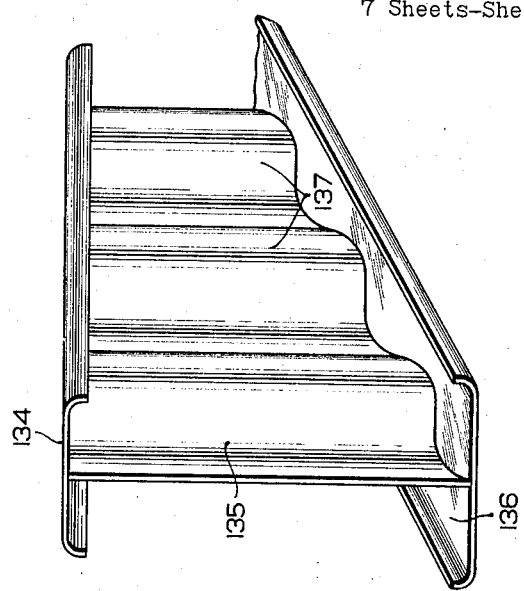
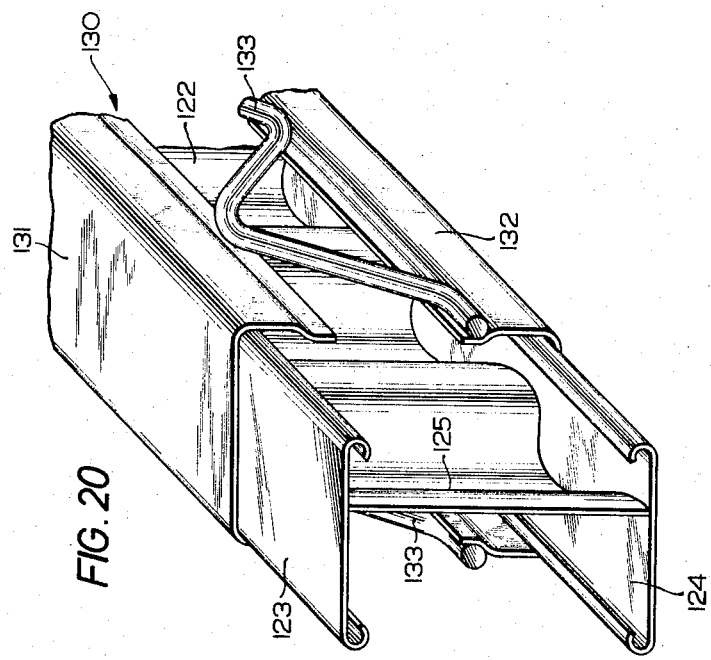
INVENTORS
HANS PRELLER
KARL-GERD KRÄMER
By: McGlew and Toren
ATTORNEYS

3,362,056
METHOD OF FABRICATING STRUCTURAL SHAPES

Hans Preller, Cologne-Weidenpesch, and Karl-Gerd Krämer, Remscheid, Germany, assignors to Theodor Wuppermann, Leverkusen, Germany
Filed June 5, 1964, Ser. No. 372,942
5 Claims. (Cl. 29—155)

ABSTRACT OF THE DISCLOSURE

A method of fabricating structural shapes is disclosed including the steps of continuously drawing strip stock from supplies thereof, the number of strips conforming to the number of different components, such as webs, flanges, and the like of the structural shape to be fabricated. In a continuous operation, each drawn strip is separately and concurrently formed to the desired respective transverse and longitudinal profiles and sections, and the formed strips are continuously moved into proper oriented relation with each other in accordance with a desired profile of the structural shape. While the strips are so oriented, they are continuously united by a metal fusion process to form a continuous structural shape. Such uniting is effected by continuously mechanically securing a strip of hard solder, provided from a supply thereof, to one longitudinal edge of one component which abuts a plane surface of another strip. Heat is then applied to hard solder the strips together to form the continuous structural shape, which is thereafter severed into preselected lengths.

The webs and flanges of the structural shapes may take various forms, with the webs being corrugated either longitudinally or transversely, for example, and the flanges being formed with reinforced edges as by turning the edges on themselves. To decrease the weight of the structural members, the webs, the flanges or both may be formed with apertures therethrough and the apertures may be formed in such a manner, as by striking out portions of the metal, to provide lugs for securing the structural members to other elements.

Background of the invention

This invention relates to the fabrication of structural shapes and, more particularly, to a novel method of fabricating such structural shapes in a substantially continuous manner.

The more common manner of manufacturing structural shapes such as I-beams, H-beams, angles and the like, and for a long time the only method, was to form these shapes by hot rolling from billets and the like. However, over a number of years, structural shapes have also been produced by fabricating the same from pre-cut and formed strips and the like, with the several strips being welded together, for example, to form the resultant structural shape.

In fabricating structural shapes by uniting components by metal fusion processes, such as welding or the like, the fabrication is usually effected as a series of separate production steps during which the individual pre-cut and pre-formed parts, such as the upper flange or chord, web and lower chord or flange are cut and formed separately, after which they are positioned in a jig or the like for welding together to form a single structural shape. It is possible, of course, where the cross sectional area of the structural shape will permit, to form the upper and lower flanges with partial webs which may then be united to each other, or to a web member, by welding or the like, to form the completed structural shape. Such formation of the upper or lower chord with a partial web may be done by cold rolling or the like, by way of example.

The fabrication of structural shapes by uniting components by metal fusion processes, such as welding or hard soldering operations, as hitherto practiced, has been subjected to a number of disadvantages. A primary disadvantage is that the individual pieces are produced in a series of separate operations, after which the individual pieces have to be separately positioned in relation with each other in a jig or the like before the metal fusion operation is effected. This involves a good deal of difficulty in proper alignment of the separate components. Frequently, a girder or structural shape fabricated by a welding operation requires further processing due to warping occurring as the result of welding. As a consequence, with present known methods of fabricating structural shapes by uniting individual components by fused metal joints, the capital investment and operating expenses are very high.

An object of the present invention is to provide a novel method of fabricating structural shapes and which is free of the disadvantages of known prior art methods.

A further object of the invention is to provide a method of fabricating structural shapes by welding together at least two separate parts which are initially in the form of metal strips or sheets.

Yet another object of the invention is to provide a method of fabricating structural shapes in which all of the production operations, including the forming and uniting, are carried out as a continuous operation in a single plant and using continuous strip stock with the trailing end of one strip being welded to the leading end of another strip so that the strip is continuously supplied to the processing apparatus.

A further object of the invention is to provide a method of fabricating structural shapes which is characterized by much faster production and greatly decreased manufacturing expense as compared to known methods.

Still another object of the invention is to provide a method of fabricating structural shapes in which the separate components may be united to each other either by welding or by hard soldering.

Another object of the invention is to provide a method of fabricating structural shapes using hard soldering for joints in which the solder is mechanically united to edges of strip material in advance of the soldering operation and in such a manner that various forming operations may be performed on the strip material having the solder mechanically clamped thereto.

Still another object of the invention is to provide a method of fabricating structural shapes and which is readily adaptable to the fabrication of structural shapes having novel and improved cross sectional contours.

In accordance with the invention, the fabrication of structural shapes is provided by starting with rolls or coils of strip or band-shaped metal stock which, by the use of conventional and known apparatus, are continuously fed through processing operations and continuously oriented into proper relation with each other in advance of the welding or hard soldering operation. In order to provide continuity of the process, by-passing or expansion loops may be provided in the strip material to secure coordination between the movements of several strips relative to each other through the apparatus of the invention. Where a hard soldering operation is used to join the strips, with the type of operation, whether hard soldering or welding, being determined by various factors, the solder may be in strip form and may be mechanically rolled on and over the edges of a web member for example. To insure better adhesion of the solder, the surface of the strip may be slightly roughened in a known manner and also cleaned in a known manner, and the solder may be applied in coordination with the application of a soldering flux. Alternatively, the flux may be supplied to the parts only at the soldering station.

When a strip of solder has been applied mechanically to the edges of the stock, in accordance with the invention, it adheres so firmly that further operations can be carried out in the piece of stock without detaching the solder therefrom. Heating of the stock to the soldering temperature can be accomplished in a known manner by use of burners or by electrical heaters or ovens.

The structural shapes produced by the invention may take many forms. Thus, one particular form of structural shape is a light steel girder including upper and lower flanges and a corrugated web, with the web and the two flanges being joined together by fused metal joints formed by welding or by hard soldering. To increase the stiffness of girders of this type, the longitudinal edges of the chords can be bent or rolled inwardly toward the web, or can be formed as tubular reinforcements, preferably rectangular in cross section. Alternatively, the longitudinal edges of the chords may be bent or turned over in a direction away from the web. The stiffness of the girder can be enhanced by using upper and lower flanges which are in the form of hollow or tubular sections, or by forming lengthwise reinforcements in the upper and lower flanges. To reduce the weight of the girder, the flanges or webs may be recessed or cut out at intervals, and tongues may be punched from the chords for use as joint elements. Wooden nailing strips may be secured to the fabricated structural shapes or, alternatively, the structural shapes can be so devised that wood or the like may be readily nailed thereto.

For an understanding of the principles of the invention, reference is made to the following description of typical embodiments thereof as illustrated in the accompanying drawings.

In the drawings:

FIG. 5 is a somewhat schematic perspective view illustrating the continuous application of solder to the edges of strip stock in accordance with the invention;

FIGS. 6A and 6B are, respectively, a plan view and a cross sectional view of a strip having solder applied to its edges as shown in FIG. 5;

FIG. 7 is a schematic layout of a production line, in accordance with the invention, for fabricating structural shapes having corrugated webs and utilizing hard soldering of joint formation;

FIGS. 8 and 9 are partial perspective views illustrating light steel girders fabricated in accordance with the invention and having chords or flanges with reinforced longitudinal edges;

FIGS. 10 and 11 are partial perspective views of fabricated girders, produced in accordance with the invention, in which the flanges have re-entrant longitudinal edges which engage the corrugations of the web;

FIG. 12 is a perspective view of a girder embodying the invention and having flanges formed with longitudinal edge lips extending outwardly of the girder;

FIG. 13 is a partial perspective view of a girder fabricated in accordance with the invention and in which the flanges are substantially rectangular cross section hollow members;

FIG. 14 is a partial perspective view of a girder, formed in accordance with the invention, and in which the flanges are formed with longitudinally extending reinforcements;

FIG. 15 is a partial perspective view of a light steel girder fabricated in accordance with the invention and in which the flanges and the web are apertured;

FIG. 16 is a partial perspective view of a structural shape fabricated in accordance with the invention and in which the flanges have tongues struck out therefrom;

FIG. 17 is a partial perspective view of a structural shape fabricated in accordance with the invention and having wooden nailing strips secured to its flanges;

FIGS. 18 and 19 are partial perspective views of girders fabricated in accordance with the invention and in which the flanges are designed to have components nailed thereto;

FIG. 20 is a partial perspective view of a structural shape embodying the invention and nested within a lattice-workbox girder; and FIG. 21 is a partial perspective view of a structural shape in accordance with the invention and having its web formed with transversely extending substantially conical corrugations.

Figure 1:
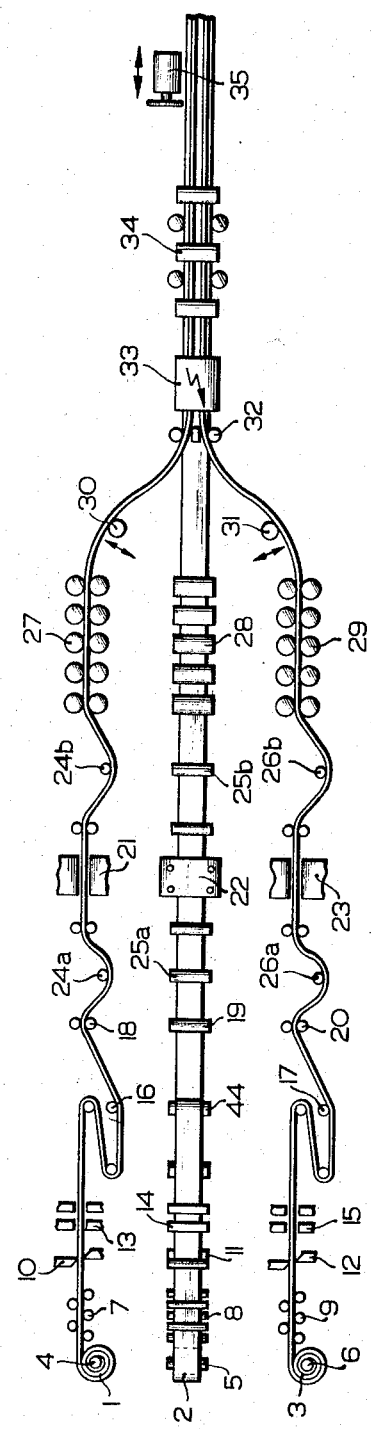
FIG. 1 is a schematic layout of one form of production line in accordance with the invention.

Referring to the drawings in particular, FIG. 1 illustrates a production layout for forming a structural shape comprising three components. In accordance with existing conditions, space requirements, and the type of stock to be processed, a decision may be made as to whether the three production lines for the individual components, which may be identical in basic design up to the welding site, are positioned along side of each other, in tandem, or above each other. Substantial variations in the layout may be used in accordance with the particular arrangement selected.

In the particular example shown in FIG. 1, the three production lines are positioned along side each other in spaced, substantially parallel relation. The starting stock preferably is a metal strip wound in coils 1, 2 and 3 mounted on reels 4, 5 and 6, respectively. The strip withdrawn from the reels passes through straightening apparatus 7, 8 and 9, which may be in the form of straightening rolls. Following the straightening operation, the strips pass between shears 10, 11 and 12, which are used to cut away tongues, blades and the like. The trailing end of one strip can be welded to the leading end of the next strip in welding devices 13, 14 and 15. In order to prevent any interruption of work during the welding process, a reserve supply of strip material can be provided in the form of by-pass loops 16, 17 and 44 adjacent the welding station.

Driving rollers 18, 19 and 20 are provided in the by-pass loops, and feed the stock to stamping assemblies 21, 22 and 23 which perform perforating, pawling, stamping, beading, and the like operations on the stock. Owing to the intermittent mode of operation of the punches of the stamping assemblies, loops of stock are provided both before and after the stamping devices, as by feeding the stock over guide rollers 24a, 25a and 26a and through guide rollers 24b, 25b and 26b. After leaving the stamping machines, the stock is fed to cold profiling or shaping units 27, 28 and 29, which are usually arranged as a series of roller pairs positioned in tandem or one behind the other. These units 27, 28 and 29 shape the stock to the desired cross sectional form.

After the strip stock leaves the shaping or forming roll stands 27, 28 and 29, the three pieces of stock are brought together. It is essential that the movement of the individual strips of stocks be exactly synchronized, and this can be effected by the use of regulating loops provided by the rollers 30 and 31. The three strips of stock are brought into a welding machine 33 through a guide roller set or radius link device 32. The type of metal fusion operation is selected in accordance with the given requirements. After welding and subsequent cooling of the welded seams, which takes place in the usual manner, the fabricated structural shape is channeled through a straightening machine 34 to correct any warpage which may have occurred. The continuous structural shape may then be severed into desired lengths by any suitable means such as, for example, a saw 35.

Figure 2:
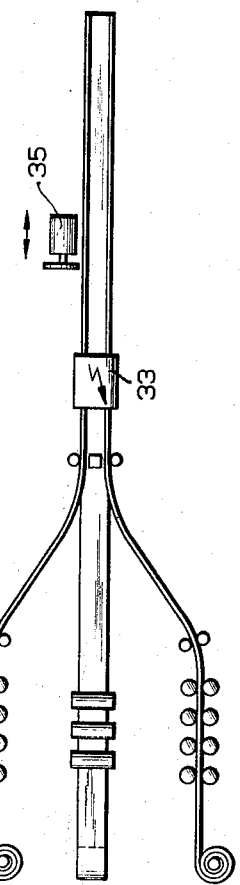
FIG. 2 is a schematic layout of a second and simpler form of production line embodying the invention.

The layout represented in FIG. 2 is a simplified embodiment of that shown in FIG. 1. In the arrangement of FIG. 2, a number of the individual operations are omitted and there are some interruptions in the process. For example, the unit of FIG. 2 may be designed purposely for interruption during the replacement of the stock supply.

Figure 3:
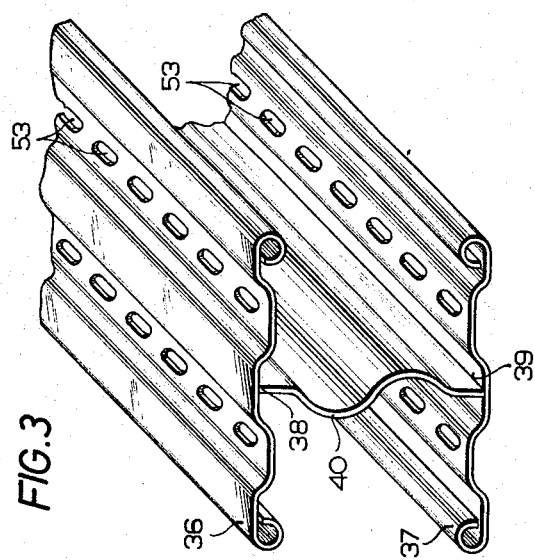

FIG. 3 illustrates a girder formed in accordance with the invention. Referring to FIG. 3, the girder comprises two flanges or chords 36 and 37 having rolled over or inturned longitudinal edges. On either side of web 40, which is longitudinally corrugated, flanges 36 and 37 are formed with elongated perforations 53 to receive connecting means. Web 40 is welded to flanges 36 and 37 as indicated at 38 and 39.

Figure 4:
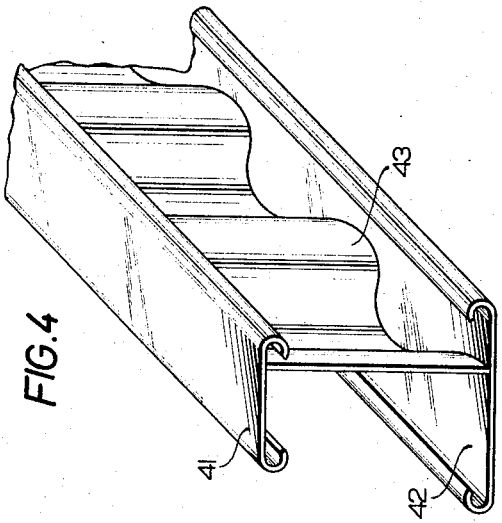
FIGS. 3 and 4 are perspective views illustrating two forms of structural shapes produced in accordance with the invention.

In FIG. 4, the structural shape comprises flanges 41 and 42 welded to a transversely corrugated web 43. The flanges 41 and 42 may have different widths, and are formed with curled or bent over longitudinal edges for reinforcement and shape stiffening purposes. Web 43 is joined to flanges 41 and 42 either by intermittent welds or by continuous weld.

FIGS. 5, 6A and 6B illustrate the application of a solder strip to the edges of the stock. Referring to FIG. 5, a strip of stock *a* is fed to the solder applying apparatus either as a pre-cut strip or a strip which is unwound from a coil thereof. With the aid of knurling wheels or rolls *b*, the edges *c* of the strip *a* are roughened. Rotary brushes *d* can be used to treat the roughened edges to remove all residue oxide from the surface. The strip edges *c* run through felt rollers *e* which deposit flux on the strip edges. The soldering strips *f* are unwound from coils *g* and have flux applied thereto by felt rollers *h*. The soldering strips then run through shaping and compressing rollers *i*, *k* and *l*. If necessity or other considerations warrant it, the flux can be applied to the solder after the solder has been applied to the edges of the strip *a*.

FIGS. 6A and 6B show a strip of stock with a roller on soldering strip along its edges. The solder strip is normally 0.1 to 0.3 mm. in thickness and extends a few millimeters inwardly of the edges of the stock.

FIG. 7 illustrates a layout for the continuous production of structural shapes using hard soldering for securing the components together. The starting stock is preferably strip which is unwound or drawn from coils 1, 2 and 3 on reels 4, 5 and 6, respectively. The strip then could be routed through straightening machines and equipment, which is not shown in FIG. 7, for the purpose of welding the trailing edge of one strip to the leading edge of a new strip. While the outer strips 1 and 3 pass through shaping and forming stands 27 and 29, center strip 2 first runs through a device indicated in broken lines at 47 for the purpose of rolling on the soldering strip or strips as shown in FIG. 5. The center strip 2 is then passed through a roller straightening machine 48.

In the case of the center strip 2, the flux is applied in conjunction with rolling on of the solder as described in connection with FIGS. 5, 6A and 6B. However, for the outer strips 1 and 3, the flux is applied thereto after they leave the forming rolls 27 and 29, and by means of fluxing units 49 and 50. The three strips are then brought together in a pressure unit consisting preferably of a plurality of sectional rollers wherein the pressure of each individual roller can be adjusted independently. Soldering may be effected with the aid of a known type of heat source such as, for example, a firing line, a furnace, or electrical heating means in the area indicated by the broken line 52. After completion of the hard soldering and a resultant cooling, which is carried out in the usual manner together with removal of the residual flux, the resultant continuous girder can be severed to desired lengths with the aid of the flying saw or shears 35.

The light steel girders shown in the drawings can be joined together in any conceivable combination. Furthermore, the invention process can be used for various cross sectional shapes of structural members, including miniature parts.

Various forms of structural shapes which may be fabricated by the method and apparatus of the invention are shown in FIGS. 8–21. Referring to FIG. 8, a structural shape is shown which embodies a pair of flanges 54 and 55 welded or hard soldered to opposite longitudinal edges of a transversely corrugated web 56. Flanges 54 and 55, which may have different widths, are formed with lips 57 and 58, respectively, extending along their longitudinal edges, for reinforcement purposes. These lips also stiffen the structural member.

In FIG. 9, chords or flanges 60 and 61 are welded or hard soldered to a transversely corrugated web 62. Flanges 60 and 61 have their longitudinal edges curled as at 63 and 64, respectively, for reinforcing and stiffening purposes. Flanges 60 and 61 may be of different widths or may be in the same width.

Referring to FIG. 10, chords 65 and 66 are united to a transversely corrugated web 67 by welding or hard soldering. In this case, the longitudinal edges of the chords 65 and 66 are bent to form L-shaped reinforcements whose inner edges contact the corrugations of web 67 and may be welded or soldered thereto.

In FIG. 11, a pair of flanges 70 and 71 are welded or hard soldered to a transversely corrugated web 72. In this case, the longitudinal edges of the flanges 70 and 71 are bent to form substantially closed rectangular tubes 73 and 74, respectively, which reinforce these edges. The inner sides of the tubular reinforcements 73 and 74 contact the corrugations of web 72 and may be welded or hard soldered thereto if desired. Webs 70 and 71 may have the same widths or may have different widths depending upon particular circumstances.

In the embodiment shown in FIG. 12, flanges 75 and 76, formed of strip stock, are welded or hard soldered to a web 77 which is transversely corrugated and which is likewise formed of strip stock. In this case, as distinguished from the arrangement shown in FIG. 8, flanges 75 and 76 have lips along their longitudinal edges as indicated at 78 and 79, and these lips are bent at substantially right angles to the general plane of flanges 75 and 76 and extend outwardly of the girder.

In FIG. 13, a structural shape is shown which comprises hollow flanges 80 and 81 which are welded or hard soldered to a transversely corrugated strip-type web 82. The flanges 80 and 81 may be formed as substantially rectangular and relatively shallow tubes, and may have the same width or may have different widths.

FIG. 14 illustrates an alternative way in which a structural shape formed in accordance with the invention may be provided with added strength and rigidity. In this case, flanges 83 and 84 are welded or hard soldered to a transversely corrugated web 85. Flanges 86 and 87 are formed with longitudinally extending corrugations, beads, or the like 86 and 87, respectively, which serve to strengthen the flanges. The flanges may be further strengthened by lips 88 and 89, respectively, extending along their longitudinal edges and preferably at right angles to the general planes of the flanges.

It is frequently desirable to lessen the overall weight of the structural shape by removing metal from structurally unimportant areas thereof. Referring to FIG. 15, flanges 90 and 91 are welded or hard soldered to a web 92. To reduce weight, flange 90 may be formed with a series of elongated slots 93, and flange 91 may be formed with a similar series of elongated slots 94. Web 92 may be formed with apertures 95. To additionally reinforce the structural shape, the edges of the flanges 90 and 91 may be bent up as right angle lips 96 and 97 extending toward each other.

For the purpose of securing the structural shapes to other structural shapes or to other elements, the flanges may be formed with struck out tongues. Thus, and referring to FIG. 16, a transversely corrugated web 100 is hard soldered or welded to flanges 101 and 102 which may have their longitudinal edges formed as reinforcing lips as previously described. Flange 101 has two series of apertured tongues 103 struck outwardly therefrom, and flange 102 has two series of apertured tongues 104 struck outwardly therefrom.

It is frequently desirable to form the structural shapes in such a manner that flooring, beams or the like may be nailed directly thereto. Such arrangements are shown in FIGS. 17, 18 and 19. In FIG. 17, the structural shape may be formed in any known manner and may be any of those previously described. It comprises a web 105 to which flanges 106 and 107 are secured by welding or hard soldering. For nailing purposes, wood strips 108 and 109 are secured to the outer surfaces of flanges 106 and 107, respectively, such securing being effected in any desired manner.

FIGS. 18 and 19 show arrangements in which the wood strips 108 and 109 may be omitted but in which the flanges of the structural shapes are formed for gripping nails. Referring to FIG. 18, a structural shape is shown comprising a transversely corrugated web 110 having flanges or chords 111 and 112 welded or hard soldered thereto. Each flange 111 and 112 is formed with the cross section of a substantially rectangular hollow box. This is done by bending the sides of the flanges inwardly parallel to the main base thereof. The innermost edges of the bent in portions are then bent outwardly, as shown at 113, and preferably have undulations extending longitudinally thereof, with the outermost edges of the portions 113 being again bent outwardly at right angles as indicated at 114. This forms longitudinally extending slots 115 which are arranged to grip nails or other fasteners which may be driven thereinto.

In FIG. 19, a web 116 has flanges 117 and 118 secured thereto as by welding or hard soldering. The longitudinal edges of the webs are bent inwardly so that each web has a substantially triangular cross section, as indicated at 119. The innermost portions of the thus inwardly bent edges are then bent outwardly substantially parallel to the bases of the flanges, as indicated at 121. A longitudinally extending slot 120 is thereby provided between the innermost edges of the bent in portions, and serves to grip a nail or other fastening element inserted or driven thereinto.

FIG. 20 illustrates how a structural shape formed by the method and apparatus of the invention may be used in a reinforced lattice-type box girder. In FIG. 20, an I-beam type of structural shape is illustrated as comprising a transversely corrugated web 122 which is welded or hard soldered to flanges 123 and 124 having reinforced edges. This forms an I-beam generally indicated at 125. I-beam 125 is conformingly telescoped within a box-shape lattice girder generally indicated at 130. Girder 130 includes channel-shaped longitudinal members 131 and 132 which are interconnected by undulating side members 133 which may be, for example, rods bent to a suitable shape. Girder 130 may be formed by the method and apparatus of the invention by welding or hard soldering together the members 131, 132 and 133 in a continuous operation.

A further variant form of structural shape which may be formed by the invention is illustrated in FIG. 21. Referring to FIG. 21, edge reinforced flanges 134 and 136 are welded or hard soldered to a web member 135. In this case, web 135 is formed with transversely extending undulations or corrugations 137 which are conical and have their apices adjacent the flange 134 and their bases adjacent the flange 136. Of course, the web 135 could be reversed in position so that the bases of the corrugations or undulations are adjacent flange 134 and the apices adjacent the flange 136.

While specific embodiments of the invention have been shown and described in detail in order to illustrate the application of the principles of the invention, it will be understood that the invention may be embodied otherwise without departing from such principles.

What is claimed is:

1. A method of fabricating elongated metal structural shapes, each including at least a pair of components united by hard soldering with at least one longitudinal edge of one component being united to a plane surface of another component, comprising the steps of: providing individual supplies of metal stock, in continuous strip form, equal in number to the number of such components in each structural shape; in a continuous operation, simultaneously drawing stock from each supply and separately and concurrently forming each drawn strip to the desired respective transverse and longitudinal profiles and sections; continuously mechanically securing a strip of hard solder, from a substantially continuous supply thereof, to such one longitudinal edge of such one component; continuously moving the formed stock strips into properly oriented relation with each other in accordance with the desired profile of the structural shape, and with such one longitudinal edge of one component having the strip of solder mechanically secured thereto abutting a plane surface of another strip; while maintaining the strips so oriented, continuously uniting them by applying heat thereto to hard solder the strips together to form a continuous structural shape; and thereafter severing the resultant continuous structural shape into preselected lengths.

2. A method of fabricating elongated metal structural shapes, as claimed in claim 1, in which said solder is mechanically rolled onto such longitudinal edge of such one component in such a manner as to engage such longitudinal edge and also overlap the portions of the plane surfaces of the component adjacent such edge.

3. A method of fabricating elongated metal structural shapes, as claimed in claim 1, including the steps of, in advance of mechanically securing the solder to such one longitudinal edge of such one component, slightly roughening and mechanically cleaning such one longitudinal edge.

4. A method of fabricating elongated metal structural shapes, as claimed in claim 1, including the steps of, in conjunction with the mechanical securement of the solder to such one longitudinal edge of such one component, effecting a substantially continuous fluxing operation.

5. A method of fabricating elongated metal structural shapes, as claimed in claim 1, including the steps of, during the hard soldering operation, maintaining a resilient pressure against the oriented components to maintain them in firm contact with each other.

References Cited

UNITED STATES PATENTS

| 2,056,563 | 10/1936 | Budd et al. | 52—729 X |
| 2,065,493 | 12/1936 | Greulich | 52—729 X |
| 2,108,795 | 2/1938 | Budd | 52—729 X |
| 2,432,622 | 12/1947 | Johnston | 52—729 X |
| 2,746,139 | 5/1956 | Van Pappelendam | 29—455 |
| 2,939,206 | 6/1960 | Keller | 29—155 |
| 3,162,942 | 12/1964 | Christman | 29—471.1 X |
| 3,214,875 | 11/1965 | Slowinski et al. | 52—729 X |
| 3,241,285 | 3/1966 | Baroni | 52—729 X |
| 3,256,419 | 6/1966 | Taylor | 29—430 X |
| 3,263,305 | 8/1966 | Butler et al. | 29—155.5 |

FOREIGN PATENTS

| 829,299 | 3/1960 | Great Britain. |

CHARLIE T. MOON, *Primary Examiner.*

THOMAS H. EAGER, *Examiner.*